US005725853A

United States Patent [19]
Dennis et al.

[11] Patent Number: 5,725,853
[45] Date of Patent: Mar. 10, 1998

[54] 4 STRAIN DIRECT-FED MICROBIAL

[75] Inventors: Scott M. Dennis, Urbandale; William M. Rutherford, Des Moines, both of Iowa; Sandra J. Croak-Brossman, Easton, Conn.; Hanna A. Hill, Irvine, Calif.

[73] Assignee: Pioneer Hi-Bred International, Inc., Des Moines, Iowa

[21] Appl. No.: 325,023

[22] Filed: Oct. 18, 1994

[51] Int. Cl.⁶ ........................ C12N 1/20
[52] U.S. Cl. ............... 424/93.3; 424/93.44; 424/93.45
[58] Field of Search .................. 424/93.3, 93.44, 424/93.45; 435/243, 252.4, 252.9, 253.4, 853, 856, 857, 885

[56] References Cited

U.S. PATENT DOCUMENTS

| | | | |
|---|---|---|---|
| 4,956,295 | 9/1990 | Sudoma | 435/252.1 |
| 5,310,555 | 5/1994 | Zimmer | 424/438 |

FOREIGN PATENT DOCUMENTS 249286  2/1988  Czech Rep. .

OTHER PUBLICATIONS

David P. Hutcheson, et al., J. Anim. Sci. 1986, 62:555–560.

David P. Hutcheson, et al., Proceedings, Western Section, American Society of Animal Science, vol. 31, 1980, pp. 213–215.

Jay R. Brown, et al., Agri–Practice—Pharmacology, vol. 10, No. 4, Fall 1989, pp. 14–16.

D.R. Gill, et al., 1987 Animal Science Research Report, pp. 202–204.

*Primary Examiner*—Jean C. Witz
*Attorney, Agent, or Firm*—Zarley, McKee, Thomte, Voorhees, & Sease

[57] ABSTRACT

Growth and well being promotion of domesticated meat-producing animals is accomplished by administering to the animal in conjunction with its normal feed ration, direct-fed microbial consortium of bacteria consisting essentially of *Streptococcus faecium* 301, *Lactobacillus plantarum* 211, *Lactobacillus plantarum* S80, and *Lactobacillus casei* 322 or the genetic equivalents thereof.

19 Claims, No Drawings

4 STRAIN DIRECT-FED MICROBIAL

BACKGROUND OF THE INVENTION

Stress is a known phenomena that adversely affects animals from the human species down to some of the lowest organisms. The effects of stress can be exhibited in a wide variety of ways. For example, often there is a general decrease in overall health and well being. This may manifest itself in weight loss, deteriorating overall health, and an increased susceptibility to opportunistic pathogens.

Particularly for livestock animals, but also for pets, there are numerous predictable times during life wherein stress is likely to increase. One of the most common occurrences is shipping and handling stress. It is, of course, known that domesticated livestock, such as ruminants and nonruminants alike, including sheep, cattle, swine, poultry, etc., are all raised in areas most suited to the presence of a bountiful supply of nearby feed and grain. However, these domesticated animals must often be shipped some distances for final feeding and then slaughter. Shipping and handling stress often aggravate deficiencies already existing in the animal. This can cause weight loss, as well as increased susceptibility to opportunistic pathogens. As a result, animals being shipped from one feeding area to another commonly develop a significant level of stress, and when their immune system is challenged, the result may be a period of high disease incidence.

In addition to shipping and handling stress, periods of predictable stress come shortly after birth, shortly after weaning, and, of course, at any time during life when there is injury, trauma, or invasion by disease pathogens. Similarly, stress can come when animals are subjected to periods of adverse climatic changes. Thus, in unusually hot periods any significant deprivation of water, even for short periods, can result in stress; conversely, long periods of cold can cause stress.

The stresses associated with weaning, marketing and shipping of cattle to the feedlot can have a negative impact on the animal's ability to defend itself from viral and bacterial infections. Rapidly restoring feed and water consumption and nutrient balance could result in improved animal health and performance.

Bacterial populations in animal digestive systems are enormously complex biological ecosystems. The group of animals of concern here can be roughly divided into two groups: ruminants, such as cattle, sheep, deer, etc. and nonruminants, such as rodents, humans and birds. These two groups are physiologically different in the digestive process including where the fermentation for digestion of nutrients occurs. In ruminants the fermentation occurs first, and thus they can eat very fibrous food which is later absorbed. In nonruminants preliminary fiber digestion is not observed, and less complex and fibrous food is utilized first, and residual fibers are fermented in the large intestine.

Because the basic animal diet and mechanism for digestion is fundamentally different in these two groups, the resident microbial communities living in association with the host also differ in both number of species and complexity. Literally hundreds of species have been identified from animal intestinal tracts, and populations can exceed 100 billion/g of contents.

The age of the animal also has a profound effect on intestinal physiology and microbial populations. Animals are born with a sterile intestinal tract and become colonized by those bacteria in feed, or their environment. Adult animals have a generally stable microflora that is usually disturbed only by drugs, disease, stress, or marked dietary changes.

The interaction between the animal, its environment, diet, and its residential microbial gut community is poorly understood. Inferences from the microbial balance have been made for the presence or absence of the disease state, and for reduced animal performance.

It is, of course, common to treat either diseased or stressed animals with therapeutic drugs to which the animal may hopefully favorably respond. However, if the animal is a domesticated livestock animal used for human food consumption, adulteration of the carcass with drugs is not desirable.

Direct feed microbials have been successfully used by cattle feeders to replenish the gut bacterial population with natural beneficial bacteria during times of stress (Crawford, et al., 1980, Hutcheson and Cole, Management of Transit-stress Syndrome in Cattle: Nutritional and Environmental Effects. *J. Anim. Sci.* 62:555, 1986). Direct feed microbials have been shown to get newly-arrived feedlot cattle on feed faster (Hutcheson, et al., The Use of Living, Nonfreeze Dried *Lactobacillus acidophilus* Culture for Receiving Feedlot Calves, *Proc. West. Sec. Amer. Soc. of Anim Sci.* 31:213, 1980).

There has been in the past a direct feed microbial composition publicly used and sold under the trademark PROBIOS by Pioneer Hi-Bred International. Initially the Pioneer PROBIOS direct-fed microbial composition had twelve organisms, later reduced to eight, and even later, five strains. However, there never has been a composition limited to the four strains disclosed herein.

It is desirable to narrow the strains of the composition to those minimum number of strains which are efficacious in order to decrease cost and to maximize benefit to the animal. Indeed, in the past one of the greatest difficulties in using direct feed microbial compositions is to find which strains, from a consortium of bacteria, truly are effective in producing the desired result in the meat animal.

It has now been found that consortium of four bacteria, or the genetic equivalents of those four bacteria, all of which are naturally occurring harmless bacteria, if fed to mammals, somehow have a synergistic resulting effect. They somehow interact to provide growth enhancement, overall well being, and perhaps mediate the effects of stress. This important result follows from feeding of a natural consortium of four carefully defined, and certain bacteria to mammals. The consortium of bacteria somehow corrects the pathology of the animal's system in such a manner that the host animal is quickly returned to an economically producing animal.

Accordingly, it is a primary objective of the present invention to provide a method of promoting growth enhancement and overall well being of domesticated, meat-producing animals by use of a consortium of four direct-fed microbials.

Another objective of the present invention is to provide a direct-fed microbial composition of bacteria which, when fed, corrects the pathology of the animal system in such a manner that the host animal is quickly returned to an economically producing animal.

A further objective of the present invention is to provide a consortium of bacteria in the form of a direct-fed microbial composition which can be fed in conjunction with daily free choice feed rations.

Yet another objective of the present invention is to provide a direct-fed microbial composition which can be fed to domesticated livestock and poultry in order to increase overall health, well being, and in general, increase the economics of the animal to its producer.

A still further objective of the present invention is to provide a direct-fed microbial composition which contains the minimum number of naturally occurring bacteria central to promotion of overall animal growth and well being, and which therefore does not contain extraneous, costly and unnecessary strains of bacteria which may interfere with the interaction of the essential strains.

The method and manner of accomplishing each of the above objectives will become apparent from the detailed description of the invention which follows hereinafter.

SUMMARY OF THE INVENTION

A method and composition for administering to mammals to promote growth, to mediate the effects of stress, and to promote overall health and well being of the animal to increase its economic potential to the producer. The method comprises administering to the animal, in conjunction with its feed ration, a small but treatment effective amount of direct-fed microbial consortium of bacteria. The consortium of bacteria consists of *Streptococcus faecium* 301, *Lactobacillus plantarum* 211, *Lactobacillus plantarum* 080, and *Lactobacillus casei* 322 or the genetic equivalents thereof. The consortium of bacteria is fed in conjunction with daily feed rations. When this occurs, the animal rapidly returns to normal weight gain, may even exhibit increased weight gain, and responds better to environmental stress.

DETAILED DESCRIPTION OF THE INVENTION

As earlier described, the invention herein relates to administering to a mammal for a period of time prior to stress, during stress, and for a period of time after stress, of a small, but mediating effective amount of a direct-fed consortium of bacteria. The consortium of bacteria consists essentially of pure cultures of *Streptococcus faecium* 301, ATCC Deposit No. 55593, *Lactobacillus plantarum* 211, ATCC Deposit No. 55577, *Lactobacillus plantarum* 080, ATCC Deposit No. 55576, and *Lactobacillus casei* 322, ATCC Deposit No. 55578, or the genetic equivalents thereof. These strains are deposited in Germany at the Deutsche Sammlong von Mikroorganismen und Zel Kulturen GMBH and were deposited with the American Type Culture Collection, 12301 Parklawn Drive, Rockville, Md. 20852, on May 5, 1994 and Jun. 21, 1994. These bacterial strains have been code designated as SF 301, LP 211, LP 080, and LC 322.

The term "genetic equivalent" as used herein is to be understood to mean not only the precise strains of the present invention, but mutants thereof, or genetically altered bacteria which nevertheless have a common identifying characteristic of successful performance in the present invention.

From time to time, reference is made to a biologically pure or substantially pure culture of the above referred consortium of bacterial strains. This is intended to refer to a culture which contains no other bacterial species in quantities sufficient that they interfere with the stress-treating effectiveness of the strains above referred to. It is important that cultures be substantially free of interfering bacteria, since other bacteria either have no effect on the consortium or may have a detrimental effect on achieving the objectives of the invention.

Generally speaking, the consortium of bacteria described herein should be administered in a preventative manner before disease, but certainly as soon as disease or stress is noted. The consortium of bacteria should also be fed just prior to and during a period of high stress, such as shipping, for at least seven days, and preferably fourteen days after the period of stress. When this treatment is done, for reasons not precisely known, the effects of common disease, i.e. diarrhea, etc. and shipment stress are diminished or mediated. Thus the animal is not as susceptible to weight loss, is not as susceptible to decreased well being, and is not as susceptible to other disease-producing pathogens.

The level of the organism count should be within the range from about $10^5$ organisms to about $10^9$ organisms/gram of diet, preferably from about $10^3$ to about $10^9$ organisms/gram of diet, preferably from about $10^3$ to about $10^6$ organisms/gram of diet. The consortium of bacteria preferably includes each of the above referred to bacterial strains in equal amounts. However, the importance is not the equal levels of each, but rather that a sufficient amount of each is present to obtain the desired health effective result.

The manner of administering the consortium of bacteria may be by conventional mixing with feed. The feed is thereafter fed in a free choice manner. It may be also mixed with an adjuvant and administered by oral inoculation means. The adjuvant can be water, saline, or a non-toxic vegetable oil. Another means of administration, suitable for some animals, is preparation of a non-toxic edible gel composition which can be placed on the hind leg of the animal. The animal then self-administers the microbial consortium by simply licking the gel from his hind leg during grooming. Such a gel is typically administered to young animals at birth, 7 to 10 days of age, and at weaning. The gel can be any non-toxic edible gel, such as thickened vegetable oil, or other oil-based edible gel formulations.

It is important to realize the full benefits of the present invention that the consortium of biologically pure or substantially pure cultures of the above referred to strains are fed at all normal times, but certainly prior to stress, always during stress, and immediately after stress. If fed during these times, there is a distinct and measurable mediating effect.

The following examples illustrate by feedlot studies the effects of direct-fed microbial in comparison with controls for cattle to reduce the incidence of bovine respiratory disease (BRD) and/or diarrhea in incoming feedlot cattle during the initial receiving period and thereafter.

In the second series of examples, the effect of stress and the mediation thereof by direct-fed microbial composition of the present invention are measured in the study of mice. Mice are well known laboratory control animals, and therefore there is a reasonable correlation between the testing for mice and the testing for other mammals, both ruminants and nonruminants.

The following examples are offered to further illustrate, but not necessarily limit, the scope of the present invention.

BOVINE EXAMPLES

The objective of the feedlot studies was to determine the optimal dosage level of a direct-fed microbial to reduce the incidence of BRD and/or diarrhea in incoming feedlot cattle during the initial receiving period. The treatments were accessed by recording the number of cattle pulled from pens and diagnosed and treated for BRD and/or diarrhea. Supporting data included morbidity scoring, mortality, weight gain, average daily gain, feed intake and feed efficiency.

The animals selected for test were pulled from the pens as diagnosed for BRD and/or diarrhea as the main criteria. Morbidity scoring, mortality, weight gain, average daily gain, feed intake and feed efficiency were collected as supporting data. Five studies were conducted at four different independent feedlot locations. Steers were utilized in four studies; one location conducted the study on heifers. The average weights of the crossbred cattle for the five studies ranged from 178 kg to 257 kg. The number of pens per location varied from 8 to 16 with the number of beef cattle per pen ranging from 10 to 30.

All cattle within a study location arrived at the feedlot within a 24-hour period. Each truckload was kept separate and considered a source. The cattle were processed the day following arrival. All animals were put through the normal health program of the feedlot. Processing included, depending on the location, vaccinations for BVD, IBR, PI₃, BRSV, *Haemophilus somnus*, seven-way clostridial, injection of ivermectin, vitamin A-D₃ and implanting. The four direct feed microbial treatments were 0 cfu·kg $BW^{31\ 1}·d^{-1}$ (direct-fed microbial), $4.4×10^3$ cfu·kg $BW^{31\ 1}·d^{-1}$ (direct-fed microbial 2), $4.4×10^5$ cfu·kg $BW^{-1}·d^{-1}$ (direct-fed microbial 3), and $4.4×10^7$ cfu·kg $BW^{-1}·d^{-1}$ (direct-fed microbial 4). The non-pathogenic, viable lactic acid producing bacteria were isolated from the gastro-intestinal tract of healthy animals, namely, a consortium of direct-fed microbial composition bacteria consisting essentially of *Streptococcus faecium* 301, *Lactobacillus plantarum* 211, *Lactobacillus plantarum* 080, and *Lactobacillus casei* 322. Equal amounts of each of the immediately enumerated bacteria were present.

The feedlot personnel were blinded to the treatments. One or two ear tags were used by each feedlot to identify each animal by treatment and pen. During processing, the cattle were weighed and assigned to a treatment and pen by weight and source. One of the following methods was used by the feedlots to allocate cattle to a treatment and pen. In the first method, individual animals were assigned to a treatment and pen as the animal ran over the scale and through the chute (day 0). Each truckload of cattle was processed separately. A computer program was used to randomize the cattle by weight and source into each treatment and pen. The animals were run through the chute a second time, given the assigned direct-fed microbial treatment, and placed into the appropriate pen. In the third method, individual animals were weighed and ear tagged the first day (day −1). Each truckload of cattle was processed separately. A computer program was used to randomize the cattle by weight and source into each treatment and pen. The animals were run through the chute a second time (day 0), weighed, given the appropriate direct-fed microbial treatment, and placed into the assigned pen.

The three randomization procedures utilized to allocate cattle to a treatment and pen by starting weight did not differ between pens within a study or across the five studies.

During processing, cattle that were identified as unacceptable due to physical trauma, i.e. fractured limbs, severe wounds or obvious severe illness by the feedlot operator and the research sponsor were not placed in the study.

The direct-fed microbial treatments were given as an oral drench at day 0 and as a top dress for days 1 through 14. The direct-fed microbial treatments administered at day 0, regardless of dose titration level, were extended with whey. The top dressed direct feed microbial treatments, regardless of dose titration level, were extended with calcium carbonate. The top dress was applied at each morning feeding.

The cattle were fed rations formulated to meet or exceed the nutrient requirements of beef animals of this weight and type. The diet ingredients included, depending on the location, shelled corn, high-moisture shelled corn, whole-plant corn silage, alfalfa hay, protein supplement, wheat middlings, molasses, and vitamin-mineral supplement. A coccidiostat was allowed to be fed with the direct-fed microbial if it was compatible with the direct-fed microbial and was fed to all animals. No antibiotics, buffers or inophores were allowed in the feed from day 0 through 14. Animals were given ad libitum access to feed and water. A 30-day feeding period followed the 15-day direct-fed microbial treatment period to ensure no detrimental effects of the direct-fed microbial dose levels.

The cattle were observed twice per day by feedlot personnel for physical and clinical indications of illness, such as diarrhea, depression, anorexia, labored breathing, ocular discharge, and nasal discharge. Animals showing signs of sickness were pulled from the pen for examination. Animals were categorized as morbid if rectal temperature was equal to or greater than 40° C. The rectal temperature criteria for the studies is similar to that utilized by Brown, et al., The Use of Liquamycin® LA-200 in the Prevention of the Bovine Respiratory Complex, *Agri-Practice*, 10:14 (1989). Brown's, et al. study of bovine respiratory complex in feedlot cattle mandated a rectal temperature of greater than 40° C. in their morbidity criteria. Gill, et al. 1, The Effect of Probiotic Feeding on Health and Performance of Newly-arrived Stocker Calves, *OK Anim. Sci. Research Report*, 202–204 (1987) in a receiving study also mandated a body temperature of greater than 40° C. as part of the criteria for classifying animals as morbid. Once an animal was categorized as morbid by the attending feedlot veterinarian, it was medically treated and considered a failure for the direct-fed microbial dose level. A morbidity score sheet was used to access the severity of the sickness. Diagnosis was made by the feedlot veterinarian. A medical treatment protocol was established prior to the trial by the feedlot veterinarian and management. Animals given medical treatment were returned to the appropriate pen or placed in a sick pen, depending on the study location. Animals placed in a sick pen during days 0 through 14 were given the proper daily dose of direct-fed microbial in the form of an oral gel.

Animals that died during the study were necropsied and the cause of death determined by the feedlot veterinarian.

Weights were taken on day −1 and/or day 0 (depending on the allotment method used), day 15, day 30 and day 45 (shrunk weight). The day 45 weights were recorded after withholding feed for approximately 20 hours and water approximately 16 hours.

Weight gain, average daily gain, feed intake and feed efficiency were calculated on a per pen and animal day basis and analyzed using the analysis of variance procedures. Animal body weights over locations were analyzed over time.

The overall incidence of morbidity during the 15-day direct feed microbial treatment period was 10%, 13.9%, 19.4%, 31.7% and 52.8% for the five studies. A total of 1,500 beef cattle were analyzed from the five studies; however, due to some animals being pulled for medical treatment by the feedlot veterinarian without meeting the morbidity criteria, 1471 cattle were used in the morbidity analysis. All cattle were included in the performance data.

The frequency of animals pulled from the pens for BRD and/or diarrhea versus those animals not pulled between direct-fed microbial treatments was analyzed (Table 1). The overall morbidity of the five studies was 26.4%. The overall frequency of animals pulled for BRD and/or diarrhea versus animals not pulled over the five studies, though not different, indicated a trend in the reduction of the incidence of BRD and/or diarrhea between direct-fed microbial treatments. The individual direct feed microbial treatment frequencies were statistically compared to the control (direct-fed microbial) and each direct-fed microbial dose level to determine the optimal dose level. The direct-fed microbial 3 level reduced the incidence of BRD and/or diarrhea compared to the control (direct-fed microbial 1). The direct-fed microbial 3 level also indicated a reduction in the incidence of BRD and/or diarrhea compared to direct-fed microbial 4 (P=0.058). There was no difference between direct feed microbial 2 and direct-fed microbial 3 in the incidence of BRD and/or diarrhea. The direct-fed microbial 2 indicated a slight effect decreasing the number of pulls compared to direct-fed microbial 1; however, this was not consistent between studies. The direct-fed microbial 4 level did not appear to reduce the incidence of BRD and/or diarrhea compared to direct-fed microbial 1, but did not have detrimental effects on animal performance as compared to direct-fed microbial 1. Based on the economics of production and quality assurance/quality control methods, the direct-fed microbial 3 level was deemed the optimal dose level for the reduction in the incidence of BRD and/or diarrhea during the initial receiving period of incoming feedlot cattle.

The total number of cattle diagnosed as BRD and/or diarrhea for each direct-fed microbial treatment over the five studies during the 15-day dosing period as diagnosed by the attending veterinarian are found in Table 2. No differences were observed; however, numerically the direct-fed microbial treatment showed a 13.2% reduction in the number of cattle pulled for BRD and/or diarrhea compared to direct-fed microbial 1, while the direct-fed microbial 3 treatment had a 20.8% decrease in pulls compared to direct-fed microbial treatment.

The morbidity scores of animals pulled for BRD and/or diarrhea during the 15-day dosing period are shown in Table 3. No differences were found in the frequency distribution between direct-fed microbial 1 and the individual direct-fed microbial treatment levels for animals exhibiting ocular discharge and nasal discharge. There were no differences between direct-fed microbial 1 and each direct-fed microbial treatment level in the frequency distribution of appetite depression, depression, or diarrhea scores.

A total of 40 deaths occurred during the 15-day treatment period (Table 4). The cause of death did not differ between direct-fed microbial treatments. There was a 40.0% reduction in the number of dead animals in direct-fed microbial 2 treatment compared to direct-fed microbial 1. A 33.3% reduction in mortality was observed in direct-fed microbial 3 compared to direct-fed microbial 1. The direct-fed microbial 4 treatment had 60% fewer deaths compared to direct-fed microbial 1. The mortality rates indicate there may be the potential for a greater number of animals surviving the initial stress period in the feedlot if given a direct-fed microbial. A reduction in death loss could have a positive impact on economic returns to the producer.

Body weights on a per pen basis were analyzed over time. There were no differences in body weight between treatments within a weigh day. The absence of differences in body weight at each weigh day would indicate that the direct-fed microbial did not have a detrimental effect on cattle weight. Initial body weight dry matter intake, average daily gain and feed efficiency during the 15-day dosing period and the 45-day collection period for each treatment group are shown in Table 5. There were no differences for performance traits within the weigh periods between direct-fed microbial treatments. The absence of differences in performance parameters would indicate that the direct-fed microbials did not have a detrimental effect on cattle performance.

TABLE 1

CATTLE MEETING MORBIDITY CRITERIA VERSUS NON-MORBID CATTLE

| Item | DFM dose level[a] | | | | |
|---|---|---|---|---|---|
| | DFM1 | DFM2 | DFM3 | DFM4 | $P > X^{2b}$ |
| Pulled for morbidity[c] | 106 | 92 | 84 | 106 | |
| Not pulled | 262 | 277 | 284 | 260 | .160 |
| Total[d] | 368 | 369 | 368 | 366 | |
| Probability same as[e]: | | | | | |
| DFM1 | — | .236 | .064 | .962 | |
| DFM2 | | — | .503 | .218 | |
| DFM3 | | | — | .058 | |
| DFM4 | | | | — | |

TABLE 1-continued

CATTLE MEETING MORBIDITY CRITERIA VERSUS NON-MORBID CATTLE

| Item | DFM dose level[a] | | | | |
|---|---|---|---|---|---|
| | DFM1 | DFM2 | DFM3 | DFM4 | $P > X^{2b}$ |

[a]DFM treatments were administered on a cfu · kg $BW^{-1}$ · $d^{-1}$ basis.
[b,e]A Chi-Square analysis was used to evaluate the difference between the frequency of pulled versus not pulled animals.
[c]Cattle pulled from the pen after meeting morbidity protocol requirements and given medical treatment for BRD and(or) diarrhea.
[d]A total of 1,500 animals were allotted within the five studies; however, due to not meeting the morbidity protocol requirements, the number of animals in the comprehensive morbidity analysis was 1,471.

TABLE 2

ILLNESS DIAGNOSIS OF CATTLE BY DFM DOSE LEVEL FROM DAYS 0 THROUGH 14

| Illness | DFM dose level[a] | | | | |
|---|---|---|---|---|---|
| | DFM1 | DFM2 | DFM3 | DFM4 | $P > X^{2b}$ |
| BRD | 97 | 85 | 73 | 96 | |
| Diarrhea | 1 | 1 | 2 | 2 | |
| BRD and diarrhea | 8 | 6 | 9 | 8 | 912 |
| Total | 106 | 92 | 84 | 106 | |
| Percent difference from DFM1 | — | -13.2 | -20.8 | 0 | |

[a]DFM treatments were administered on a cfu · kg · $BW^{-1}$ · $d^{-1}$ basis
[b]A Chi-square analysis was used to evaluate the difference between the frequencies of type of illness.

TABLE 3

THE EFFECT OF DFM DOSE LEVEL ON THE DISTRIBUTION OF MORBIDITY SCORES OF MORBID CATTLE

| Morbidity trait | Dose level[a] | Score | | | | Probability same as DFM1[b] |
|---|---|---|---|---|---|---|
| | | No | Yes | | | |
| Ocular discharge | DFM1 | 45 | 61 | | | — |
| | DFM2 | 44 | 48 | | | .448 |
| | DFM3 | 41 | 43 | | | .382 |
| | DFM4 | 48 | 58 | | | .678 |
| Nasal discharge | DFM1 | 14 | 92 | | | — |
| | DFM2 | 16 | 76 | | | .413 |
| | DFM3 | 20 | 64 | | | .058 |
| | DFM4 | 21 | 85 | | | .195 |
| | | 0 | 1 | 2 | 3 | |
| Appetite depression[c] | DFM1 | 8 | 41 | 47 | 10 | — |
| | DFM2 | 4 | 36 | 48 | 4 | .993 |
| | DFM3 | 4 | 37 | 34 | 9 | .894 |
| | DFM4 | 16 | 36 | 48 | 6 | .194 |
| Depression[d] | DFM1 | 9 | 51 | 41 | 5 | — |
| | DFM2 | 3 | 58 | 30 | 1 | .377 |
| | DFM3 | 5 | 46 | 29 | 4 | .880 |
| | DFM4 | 6 | 57 | 42 | 1 | .677 |
| Diarrhea[e] | DFM1 | 72 | 19 | 13 | 2 | — |
| | DFM2 | 61 | 21 | 10 | 0 | .736 |
| | DFM3 | 62 | 11 | 11 | 0 | .422 |

[a]DFM treatments were administered on a cfu · kg $BW^{-1}$ · $d^{-1}$ basis
[b]Ocular and nasal discharge probabilities result from a Chi-Square test. Appetite depression, depression and diarrhea probabilities result from Mantel-Haenszel Chi-Square test.
[c]Appetite depression scores: 0 = none; 1 = mild; 2 = moderate; 3 = severe.
[d]Depression scores: 0 = none; 1 = mild; 2 = moderate; 3 = severe.
[e]Diarrhea scores: 0 = none; 1 = mild; 2 = moderate; 3 = severe.

TABLE 4

DIAGNOSIS OF DEATHS RECORDED FROM DAY 0 THROUGH 14

| Diagnosis | DFM dose level[a] | | | | $P > X^{2b}$ |
|---|---|---|---|---|---|
| | DFM1 | DFM2 | DFM3 | DFM4 | |
| Pneumonia | 15 | 9 | 7 | 4 | |
| Diarrhea | 0 | 0 | 0 | 1 | |
| Pneumonia and diarrhea | 0 | 0 | 1 | 0 | |
| Pneumonia and coccidiosis | 0 | 0 | 2 | 1 | |
| Total | 15 | 9 | 10 | 6 | .112 |
| Percent difference from DFM1 | | −40.0 | −33.3 | −60.0 | |

[a] DFM treatments were given on a cfu · kg $BW^{-1}$ · $d^{-1}$ basis.
[b] The frequency of death between dose levels was analyzed by Chi-Square analysis.

TABLE 5

LEAST-SQUARE MEANS AND STANDARD ERRORS OF DRY MATTER INTAKE, AVERAGE DAILY GAIN AND FEED EFFICIENCY FOR INCOMING FEEDLOT CATTLE

| Dose level[a] | Initial weight (kg)[b,c] |
|---|---|
| DFM1 | 218.4 (.94) |
| DFM2 | 216.7 (.94) |
| DFM3 | 218.3 (.94) |
| DFM4 | 217.6 (.94) |

| | Day 0 to 15 | Day 0 to 45 |
|---|---|---|
| | Dry matter intake (kg · d)[c] | |
| DFM1 | 4.53 (.06) | 6.16 (.05) |
| DFM2 | 4.48 (.06) | 6.07 (.05) |
| DFM3 | 4.52 (.06) | 6.12 (.05) |
| DFM4 | 4.52 (.06) | 6.12 (.05) |
| | Average daily gain (kg)[c] | |
| DFM1 | 1.22 (.06) | 1.10 (.02) |
| DFM2 | 1.31 (.06) | 1.13 (.02) |
| DFM3 | 1.24 (.06) | 1.12 (.02) |
| DFM4 | 1.22 (.06) | 1.12 (.02) |
| | Feed efficiency (kg DM · kg $gain^{-1}$)[c] | |
| DFM1 | 3.83 (1.23) | 5.60 (.10) |
| DFM2 | 3.58 (1.23) | 5.36 (.10) |
| DFM3 | 3.95 (1.23) | 5.44 (.10) |
| DFM4 | 6.01 (1.23) | 5.46 (.10) |

[a] DFM treatments were administered on a cfu · kg $BW^{-1}$ · $d^{-1}$ basis.
[b] Initial body weight was either day 0 weight on an average of day −1 and day 0 weight depending on the allotment method used by the feedlot.
[c] Least-sguare means and standard error ( ). Statistical differences between DFM dose levels were determined using the Bonferroni multiple means comparison adjustment. A probability level of $P < .0042$ for each mean comparison was required to retain an overall probability level of $P < .05$.

In sum, the administration of an experimental direct-fed microbial product to incoming feedlot cattle had a positive effect on the reduction of the incidence of bovine respiratory disease and/or diarrhea during the first 15 days post arrival at the feedlot. The dose response observed indicated that within the five studies summarized, the $4.4 \times 10^5$ cfu·kg $BW^{-1}$·$d^{-1}$ level decreased the incidence of bovine respiratory disease and/or diarrhea compared to the 0 cfu·kg $BW^{-1}$·$d^{-1}$ level at a rate that approached significance. Supporting data, including morbidity scores, mortality, weight gain, average daily gain, feed intake and feed efficiency indicated no detrimental effects of feeding the experimental direct-fed microbial product. The efficacy of the experimental direct-fed microbial administered at the $4.4 \times 10^5$ cfu·kg $BW^{-1}$·$d^{-1}$ levels should be verified with a series of incoming feedlot cattle studies.

Examples showing direct-fed microbial affect on stress induced mice

A study was designed to test the effect of the individual strains of the consortium direct-fed microbial agent inoculants on the weight gain, food consumed, and feed efficiency of Swiss-Webster mice over time.

For this study six different treatments were used. Treatment 1 was a positive control. Treatment 2 was a negative control, under adverse ambient conditions, but was a placebo. Treatment 3 was *Lactobacillus plantarum* 080, under adverse ambient conditions. Treatment 4 was *Lactobacillus casei* 322, under adverse ambient conditions. Treatment 5 was *Lactobacillus plantarum* 211, under adverse ambient conditions. Treatment 6 was *Streptococcus faecium* 301, under adverse ambient conditions.

The dosage was $1 \times 10^5$ cfu/day in 9:1 saline/milk solution. The duration was 10 days for weight and feed intake, (day 0–9). The sample size for experiment 1 was 11 mice per treatment. The sample size for experiments 2 and 3 were 12 mice per treatment.

Conventional, Swiss-Webster, out-bred female mice (8–12 g) were purchased from BioLab, St. Paul, Minn., and individually housed in disposable cages (Lab-Line Instruments, Melrose Park, Ill.) at 21° C. with a 12-hour photo period. Bedding and cages were changed as needed. Water and feed (Purina Mouse Chow 5015) was given ad libitum. Adverse ambient conditions were imposed to each mouse twice daily by submerging for 10 seconds in 0° C. water.

Individual treatments were administered once a day to the mice via intubation for days 0 through 9. The appropriate dose was given in 0.1 ml of sterile saline.

Bacterial strains were prepared in sterile skim milk at a level of approximately $1 \times 10^7$ cfu/ml 72 hours before the beginning of the trial. Samples were taken for enumerating of lactobacilli and streptococci. The remainder of the sample was adjusted to the proper concentration after enumeration, separated into individual aliquots and frozen at −70° C. The aliquots served as the bacterial treatment for the duration of the trial. The thawed aliquots were diluted ten-fold with saline and used as the treatment. Negative controls received a saline solution as a placebo.

Lactobacilli and streptococci were enumerated with MRS (Mann Rogrossa Sharpe) agar (Difco) modified by the addition of 8.0 ml 2.5% cyclohexamide and 8.0 ml 20% (vol/vol) tartaric acid per liter. Samples were incubated anaerobically for 48 hours at 37° C..

Mice and feed were weighed on days 0, 1, 2, 3, 5, 7 and 9.

Experiments 1, 2 and 3 were statistically analyzed individually and collectively. Variables analyzed were weight over the 10-day period, total feed consumed, weight gained and feed efficiency.

In looking at all of the experiments overall, mouse body weight was analyzed over the three experiments for the 10-day period, using a repeated measure design (Table 6). The first hypothesis explored was to compare positive control mice to the other treatments. Positive control mice were heavier than negative control and *Lactobacillus plantarum* 211 mice at Day 1. At Day 2, the negative control and each individual strain, except Lactobacillus plantarum 080 were significantly lighter than positive control mice. By Day 3, negative control and each individual strain treatments were statistically lighter than the positive control mice.

Next, the negative control was compared to each of the four individual strains. At Day 7, negative control was significantly lighter than *Lactobacillus plantarum* 080 (Table 6). At Day 9, negative control was significantly lighter than *Lactobacillus plantatum* 080 and *Lactobacillus* casei 322, Lactobacillus plantatum 211 and Streptococcus faecium 301 were heavier than negative control mice at Day 9, though not statistically different. The individual strains did not differ within a day.

Positive control mice significantly consumed more total feed than the negative control and each individual strain, except Lactobacillus casei 322 (Table 7). Positive control mice significantly gained more weight than negative control and individual strains. Feed efficiency showed no statistical differences between the treatments.

Next, each of the individual experiments 1, 2 and 3 were analyzed. Looking first at experiment 1, experiment 1 indicated that there were no statistical differences between the positive control and each treatment except Lactobacillus plantarum 211 from Day 1 through Day 3 (Table 8). At Day 5, the positive control was significantly heavier than negative control and Lactobacillus plantarum 211 groups. By Day 7, the positive control was significantly heavier than any treatment except Streptococcus faecium 301. The positive control was statistically heavier by Day 9 than the negative control and individual strain groups.

Next, the negative control was compared to each of the four individual strains. The negative control mice were significantly lighter than the Lactobacillus plantarum 080 and Streptococcus faecium 301 at Day 1 (Table 8). This trend carried through Day 2. At Day 3, Streptococcus faecium 301 was not statistically significant from the negative control. At Day 5, the trend of Lactobacillus plantarum 080 and Streptococcus faecium 301 were heavier than the negative control. Lactobacillus casei 322 and Lactobacillus plantarum 211 were heavier than the negative control, though not statistically different. At Day 9, each of the individual strain treated mice was heavier than the negative control treatment group.

There was no significant difference between treatments for total feed consumed over the 10-day period for Experiment 1 (Table 9). The positive control mice significantly gained more weight than the individual strain treatments. Lactobacillus casei 322, Lactobacillus plantarum 211 and Streptococcus faecium 301 gained more weight than the negative control mice, though not statistically significant. There were no differences in feed efficiency between negative control and individual strain treatments. Lactobacillus plantarum 080 was significantly worse than the positive control in feed efficiency.

In experiment 2, positive control mice were heavier than other treatments starting from Day 5 through Day 9 (Table 10). By Day 9, the negative control mice were significantly lighter than the four individual strain treatments.

There was no difference in the total feed consumed between treatments over the 10-day period (Table 11). Positive control gained more weight than the negative control and Streptococcus faecium 301 treated mice. The negative control gained less total weight than the four individual strain treated mice. There were no differences in feed efficiency between treatments.

In experiment 3, the positive control mice were significantly heavier than the negative control mice at Day 0; however, there were no differences between positive control and the four individual strains (Table 12). At Day 1, there were no statistical differences between treatments for weight. Positive control mice were significantly heavier than the negative control and the four individual strains at Day 2 and maintained the trend through Day 9.

The comparison of negative control to each of the four individual strains was also explored (Table 12). At Day 9, negative control mice were significantly heavier than Streptococcus faecium 301 treated mice. Lactobacillus plantarum 080, Lactobacillus casei 322 and Lactobacillus plantarum 211 treated mice and negative control mice were not significantly different.

Positive control mice significantly consumed more feed than the negative control, Lactobacillus casei 322, Lactobacillus plantarum 211 and Streptococcus faecium 301 (Table 13) treated mice. Positive control mice significantly gained more weight than other treatments. There were no differences in the feed efficiency between treatments.

To summarize all of the mice experiments, positive control mice were significantly heavier than negative control mice, and the individual strain treated mice were analyzed within and over the three experiments at Day 9 (Table 14). Negative control mice were lighter than the individual strain treated mice. The individual strain treatments perform better and maintain a higher level of growth during the 10-day period than the negative control mice. The positive control group performed better and maintained a higher growth curve than the negative control and for individual strain treatment groups. This indicates that when the mice were placed under stress, those that were treated with a direct-fed microbial performed better than those that did not have a treatment and were subjected to the same stress.

TABLE 6

Mouse body weight measured over time, Experiments 1, 2, 3.

| TREATMENT | DAY[a] | | | | | | |
|---|---|---|---|---|---|---|---|
| | 0 | 1 | 2 | 3 | 5 | 7 | 9 |
| Positive | 11.35 | 13.12[b] | 14.18[b] | 15.24[b] | 17.62[b] | 19.29[b] | 20.85[b] |
| Control | (.16) | (.16) | (.16) | (.16) | (.16) | (.16) | (.16) |
| Negative | 10.82 | 12.31[c] | 13.09[c] | 13.95[c] | 15.46[c] | 16.15[c,d] | 15.80[c,d] |
| Control | (.16) | (.16) | (.16) | (.16) | (.16) | (.16) | (.17) |
| Lactobacillus | 11.32 | 12.70[b] | 13.55[b] | 14.10[c] | 16.06[c] | 16.94[c,e] | 16.60[c,e] |
| plantarum 80 | (.16) | (.16) | (.16) | (.16) | (.16) | (.16) | (.16) |
| Lactobacillus | 10.97 | 12.61[b] | 13.38[c] | 14.12[c] | 15.77[c] | 16.85[c,d] | 16.97[c,e] |
| casei 322 | (.16) | (.16) | (.16) | (.16) | (.16) | (.16) | (.16) |
| Lactobacillus | 10.91 | 12.25[c] | 12.93[c] | 13.84[c] | 15.34[c] | 16.34[c,d] | 16.51[c,d] |
| plantarum 211 | (.16) | (.16) | (.16) | (.16) | (.16) | (.16) | (.17) |
| Streptococcus | 11.15 | 12.62[b] | 13.35[c] | 14.16[c] | 15.72[c] | 16.30[c,d] | 16.39[c,d] |
| faecium 301 | (.16) | (.16) | (.16) | (.16) | (.16) | (.16) | (.16) |

[a]Least-squares means and standard error ( ) of weight, gm, analyzed as repeated measure design over three experiments.
[b,c]Testing hypothesis: positive control = other treatments. Means within columns with different superscripts are different (P ≦.05).
[d,e]Testing hypothesis: negative control = individual strains. Means within colums with different superscripts are different (P ≦.05).

TABLE 7

PERFORMANCE OF MICE TREATED WITH PROBIOS PRODUCT EXPERIMENTS 1, 2, AND 3

| Treatment[a] | Total Feed Consumed, gm[b] | Weight Gain, gm[c] | Feed Efficiency[d] |
|---|---|---|---|
| Positive Control | 35.28[e] (1.07) | 9.47[e] (0.36) | 3.93[e] (0.65) |
| Negative Control | 29.71[f] (1.09) | 5.09[f] (0.37) | 6.75[f] (0.67) |
| Lactobacillus plantarum 80 | 29.91[f] (1.09) | 5.26[f] (0.36) | 6.85[ef] (0.65) |
| Lactobacillus casei 322 | 31.73[ef] (1.07) | 6.18[f] (0.36) | 5.59[ef] (0.65) |
| Lactobacillus plantarum 211 | 29.55[f] (1.10) | 5.67[f] (0.37) | 6.02[f] (0.66) |
| Streptococcus faecium 301 | 29.03[f] (1.07) | 5.38[f] (0.36) | 6.29[f] (0.65) |

[a]Least-square means and standard errors ( ).
[b]Total feed consumed calculated as (food weight, Day 0 − food weight, Day 9).
[c]Weight gain calculated as (weight, Day 9 − weight, Day 0)
[d]Feed efficiency calculated as (total feed consumed/weight gain).
[e,f]Means within a column with different superscripts are different (P <.05).

TABLE 8

MOUSE BODY WEIGHT MEASURED OVER TIME EXPERIMENT 1

| Treatment | DAY[a] | | | | | | |
|---|---|---|---|---|---|---|---|
| | 0 | 1 | 2 | 3 | 5 | 7 | 9 |
| Positive Control | 10.66 (.24) | 11.85[b] (.24) | 12.72[b] (.24) | 13.65[b] (.24) | 15.71[b] (.24) | 17.35[b] (.24) | 19.57[b] (.24) |
| Negative Control | 10.19 (.24) | 10.86[bd] (.24) | 11.75[bd] (.26) | 12.57[bd] (.26) | 14.05[cd] (.26) | 15.01[cd] (.26) | 15.16[cd] (.26) |
| Lactobacillus plantarum 80 | 11.14 (.24) | 12.05[bef] (.24) | 13.01[bef] (.24) | 13.85[bef] (.24) | 15.27[bef] (.24) | 15.83[cdfg] (.24) | 15.37[cd] (.24) |
| Lactobacillus casei 322 | 10.57 (.24) | 11.69[bdfg] (.24) | 12.52[bdf] (.24) | 13.30[bdfg] (.24) | 15.10[bdfg] (.24) | 16.05[cdfg] (.24) | 16.31[cd] (.24) |
| Lactobacillus plantarum 211 | 10.26 (.24) | 10.71[cdg] (.24) | 11.38[cdg] (.24) | 12.52[cdg] (.25) | 14.10[cdg] (.25) | 15.09[cdf] (.25) | 15.66[cd] (.25) |
| Streptococcus faecium 301 | 10.89 (.24) | 12.00[bef] (.24) | 12.91[bef] (.24) | 13.64[bdf] (.24) | 15.36[bef] (.24) | 16.29[beg] (.24) | 17.03[cd] (.24) |

[a]Least-square means and standard error ( ) of weight, gm, analyzed as repeated measure design.
[b,c]Testing hypothesis: positive control = other treatments. Means within columns with different superscripts are different (P ≦.05).
[d]Testing hypothesis: negative control = individual strains. Means within columns with different superscripts different (P ≦.05).

TABLE 9

PERFORMANCE OF MICE TREATED WITH PROBIOS PRODUCT EXPERIMENT 1

| Treatment[a] | Total Feed Consumed, gm[b] | Weight Gain, gm[c] | Feed Efficiency[d] |
|---|---|---|---|
| Positive Control | 29.62[e] (1.72) | 8.92[e] (.53) | 3.40[e] (.78) |
| Negative Control | 30.59[e] (1.81) | 4.99[f] (.56) | 6.52[f] (.82) |
| Lactobacillus plantarum 60 | 25.08[ef] (1.72) | 4.23[f] (.53) | 7.90[f] (.78) |
| Lactobacillus casei 322 | 28.88[e] (1.72) | 5.73[f] (.53) | 5.44[ef] (.78) |
| Lactobacillus plantarum 211 | 23.91[f] (1.81) | 5.57[f] (.56) | 4.98[ef] (.82) |
| Streptococcus faecium 301 | 27.37[ef] (1.72) | 6.14[f] (.53) | 4.55[ef] (.78) |

TABLE 9-continued

PERFORMANCE OF MICE TREATED WITH PROBIOS PRODUCT EXPERIMENT 1

| Treatment[a] | Total Feed Consumed, gm[b] | Weight Gain, gm[c] | Feed Efficiency[d] |
|---|---|---|---|

[a]Least-square means and standard errors ( ).
[b]Total feed consumed calculated as (food weight, Day 0 − food weight, Day 9).
[c]Weight gain calculated as (weight, Day 9 − weight, Day 0).
[d]Feed efficiency calculated as (total feed consumed/weight gain)
[e,f]Means within a column with different superscripts are different (P <.05).

TABLE 10

MOUSE BODY WEIGHT MEASURED OVER TIME
EXPERIMENT 2

| Treatment | DAY[a] | | | | | | |
|---|---|---|---|---|---|---|---|
| | 0 | 1 | 2 | 3 | 5 | 7 | 9 |
| Positive | 10.93 | 13.05 | 14.11 | 15.24 | 17.81[b] | 19.24[b] | 20.42[b] |
| Control | (.31) | (.31) | (.31) | (.31) | (.31) | (.31) | (.32) |
| Negative | 10.88 | 12.60 | 13.34 | 14.38 | 16.05[c] | 16.30[c] | 14.96[c] |
| Control | (.31) | (.31) | (.31) | (.31) | (.31) | (.31) | (.32) |
| Lactobacillus | 11.07 | 12.61 | 13.37 | 14.53 | 16.20[c] | 17.48[c] | 17.77[c] |
| plantarum 80 | (.31) | (.31) | (.31) | (.31) | (.31) | (.31) | (.32) |
| Lactobacillus | 10.50 | 12.56 | 13.27 | 14.20 | 15.95[c] | 17.00[c] | 17.18[c] |
| casei 322 | (.31) | (.31) | (.31) | (.31) | (.31) | (.31) | (.31) |
| Lactobacillus | 10.85 | 12.41 | 13.12 | 14.34 | 16.15[c] | 17.35[c] | 17.07[c] |
| plantarum 211 | (.31) | (.31) | (.31) | (.31) | (.31) | (.31) | (.32) |
| Streptococcus | 11.00 | 12.44 | 13.08 | 14.15 | 15.89[c] | 16.48[c] | 16.57[c] |
| faecium 301 | (.31) | (.31) | (.31) | (.31) | (.31) | (.31) | (.31) |

[a]Least-square means and standard error ( ) of weight, gm, analyzed as repeated measure design.
[b,c]Testing hypothesis: positive control = other treatments. Means within columns with different superscripts are different (P ≤ .05).
[d,e]Testing hypothesis: negative control = individual strains. Means within columns with different superscripts different (P ≤ .05).

TABLE 11

PERFORMANCE OF MICE TREATED WITH PROBIOS PRODUCT
EXPERIMENT 2

| Treatment[a] | Total Feed Consumed, gm[b] | Weight Gain, gm[c] | Feed Efficiency[d] |
|---|---|---|---|
| Positive | 35.86[e] | 9.46[e] | 4.35[e] |
| Control | (1.87) | (.78) | (0.83) |
| Negative | 28.32[f] | 4.47[f] | 8.07[f] |
| Control | (1.87) | (.78) | (0.86) |
| Lactobacillus | 32.00[ef] | 6.63[g] | 5.26[e] |
| plantarum 80 | (1.96) | (.78) | (0.83) |
| Lactobacillus | 35.79[e] | 7.27[g] | 5.46[e] |
| casei 322 | (1.87) | (.75) | (0.83) |
| Lactobacillus | 33.51[e] | 6.23[fg] | 6.03[ef] |
| plantarum 211 | (1.96) | (.78) | (0.83) |
| Streptococcus | 30.70[f] | 5.57[fg] | 6.39[ef] |
| faecium 301 | (1.87) | (.75) | (0.79) |

[a]Least-square means and standard errors ( ).
[b]Total feed consumed calculated as (food weight, Day 0 – food weight, Day 9).
[c]Weight gain calculated as (weight, Day 9 – weight, Day 0)
[d]Feed efficiency calculated as (total feed consumed/weight gain)
[e,f,g]Means within a column with different superscripts are different (P <.05).

TABLE 12

MOUSE BODY WEIGHT MEASURED OVER TIME
EXPERIMENT 3

| Treatment | DAY[a] | | | | | | |
|---|---|---|---|---|---|---|---|
| | 0 | 1 | 2 | 3 | 5 | 7 | 9 |
| Positive | 12.53[b] | 14.49 | 15.72[b] | 16.83[b] | 19.29[b] | 21.25[b] | 22.55[b] |
| Control | (.24) | (.24) | (.24) | (.24) | (.24) | (.24) | (.24) |
| Negative | 11.42[c] | 13.44 | 14.14[c] | 14.86[c] | 16.22[c] | 17.12[c] | 17.25[cd] |
| Control | (.24) | (.24) | (.24) | (.24) | (.24) | (.24) | (.24) |
| Lactobacillus | 11.80[b] | 13.46 | 14.29[c] | 15.09[c] | 16.71[c] | 17.48[cf] | 16.72[cd] |
| plantarum 80 | (.24) | (.24) | (.24) | (.24) | (.24) | (.24) | (.24) |
| Lactobacillus | 11.88[b] | 13.55 | 14.33[c] | 14.85[c] | 16.27[c] | 17.49[cf] | 17.44[cd] |
| casei 322 | (.24) | (.24) | (.24) | (.24) | (.24) | (.24) | (.24) |
| Lactobacillus | 11.67[b] | 13.59 | 14.28[c] | 14.66[c] | 15.76[c] | 16.57[cfg] | 16.87[cd] |
| plantarum 211 | (.24) | (.24) | (.24) | (.24) | (.24) | (.24) | (.24) |
| Streptococcus | 11.55[b] | 13.39 | 14.06[c] | 14.67[c] | 15.91[c] | 16.15[cg] | 15.63[cd] |
| faecium 301 | (.24) | (.24) | (.24) | (.24) | (.24) | (.24) | (.24) |

[a]Least-square means and standard error ( ) of weight, gm, analyzed as repeated measure design.
[b,c]Testing hypothesis: positive control - other treatments. Means within columns with different superscripts are different (P ≤ .05).
[d,e]Testing hypothesis: negative control = individual strains. Means within columns with different superscripts different (P ≤ .05).
[f,g]Testing hypothesis: individual strains are equal. Means within columns with different superscripts are different (P ≤ .05).

TABLE 13

PERFORAANCE OF MICE TREATED WITH PROBIOS PRODUCT EXPERIMENT 3

| Treatment[a] | Total Feed Consumed, gm[b] | Weight Gain, gm[c] | Feed Efficiency[d] |
|---|---|---|---|
| Positive Control | 40.37[e] (1.93) | 10.02[e] (.55) | 4.05[e] (0.80) |
| Negative Control | 30.21[f] (1.93) | 5.84[f] (.55) | 5.66[ef] (0.60) |
| Lactobacillus plantarum 80 | 32.66[f] (1.93) | 4.92[f] (.55) | 7.38[f] (0.80) |
| Lactobacillus casei 322 | 30.51[f] (1.93) | 5.57[f] (.55) | 5.89[ef] (0.80) |
| Lactobacillus plantarum 211 | 31.24[f] (1.93) | 5.20[f] (.55) | 7.05[f] (0.80) |
| Streptococcus faecium 301 | 29.03[f] (1.93) | 4.45[f] (.55) | 7.93[f] (0.83) |

[a]Least-square means and standard errors ( ).
[b]Total feed consumed calculated as (food weight, Day 0 − food weight, Day 9).
[c]Weight gain Calculated as (weight, Day 9 − weight, Day 0).
[d]Feed efficiency calculated as (total feed consumed/weight gain)
[ef]Means within a column with different superscripts are different (P <.05).

TABLE 14

Summary of Day 9 mouse body weight by individual and combined experiments.

| | TREATMENT[a] | | | | | |
|---|---|---|---|---|---|---|
| Experiment | Positive Control | Negative Control | LP 80 | LC 322 | LP 211 | SF 301 |
| Combined | 20.85[b] (.16) | 15.80[c,d] (.17) | 16.60[c,e] (.16) | 16.97[c,e] (.16) | 16.51[c,d] (.17) | 16.39[c,d] (.16) |
| 1 | 19.57[b] (.24) | 15.16[c,d] (.26) | 15.37[c,d,f] (.24) | 16.31[c,e,f,g] (.24) | 15.66[c,d,f] (.25) | 17.03[c,e,g] (.24) |
| 2 | 20.42[b] (.32) | 14.96[c,d] (.32) | 17.77[c,e] (.32) | 17.18[c,e] (.31) | 17.07[c,e] (.32) | 16.57[c,e] (.31) |
| 3 | 22.55[b] (.24) | 17.25[c,d] (.24) | 16.72[c,d,f] (.24) | 17.44[c,d,f] (.24) | 16.87[c,d,f] (.24) | 15.63[c,e,g] (.24) |

[a]Least-square means and standard error ( ) of weight, gm, analyzed as repeated measure design.
[b,c]Testing hypothesis: positive control - other treatments. Means within columns with different superscripts are different (P ≦.05).
[d,e]Testing hypothesis: negative control = individual strains. Means within columns with different superscripts different (P ≦.05).
[f,g]Testing hypothesis: individual strains are equal. Means within columns with different superscripts are different (P ≦.05).

What is claimed is:

1. A method of growth promotion of a domesticated meat producing mammal, said method consisting essentially of: administering to said mammal in conjunction with its normal feed ration, at least $10^3$ organisms/gram of diet of a direct-fed microbial consortium of bacteria consisting essentially of Streptococcus faecium 301, Lactobacillus plantatum 211, Lactobacillus plantarum 080, and Lactobacillus casei 322.

2. The method of claim 1 wherein the bacterial consortium is administered in conjunction with the normal feed ration but not mixed with the normal feed ration.

3. The method of claim 1 wherein the organism count of said consortium is within the range of $10^5$ to $10^9$ organism/gram of animal diet.

4. The method of claim 3 wherein the organism count of said consortium of bacteria is within the range of from about $10^3$ organisms/gram of animal diet to about $10^6$ organisms/gram of diet.

5. The method of claim 1 wherein said mammal is a domesticated livestock animal.

6. The method of claim 1 wherein said mammal is a ruminant.

7. The method of claim 6 wherein said mammal is a sheep.

8. The method of claim 6 wherein said ruminant is a bovine.

9. The method of claim 1 wherein said mammal is a non-ruminant.

10. The method of claim 9 wherein said non-ruminant is a porcine.

11. The method of claim 9 wherein said non-ruminant is poultry.

12. The method of claim 11 wherein said poultry is a chicken.

13. The method of claim 12 wherein said poultry is a turkey.

14. The method of claim 2 wherein said consortium of bacteria is administered in a non-toxic gel or viscous composition suitable for application to an animal body wherein said animal ingests the composition by licking.

15. A direct-fed microbial bacterial consortium for growth and health promotion of a domesticated meat producing mammal, said composition consisting essentially of:
at least $10^3$ organisms/gram of diet of a consortium of bacteria consisting essentially of Streptococcus faecium 301, Lactobacillus plantarum 211, Lactobacillus plantarum 080, and Lactobacillus casei 322, and a non-toxic carrier thereof.

16. The composition of claim 15 which includes an adjuvant.

17. The composition of claim 16 wherein the adjuvant is saline.

18. The composition of claim 17 wherein each of said organisms of said consortium are present in about equal amounts.

19. The composition of claim 18 wherein the organism count of said consortium is within the range which provides from about $10^5$ to about $10^9$ organisms per gram of animal diet.

* * * * *